United States Patent
Karkkainen et al.

(10) Patent No.: US 8,516,205 B2
(45) Date of Patent: Aug. 20, 2013

(54) METHOD AND APPARATUS FOR PROVIDING EFFICIENT CONTEXT CLASSIFICATION

(75) Inventors: Leo Mikko Johanne Karkkainen, Helsinki (FI); Mikko Terho, Tampere (FI); Nouri Werdi, Espoo (FI)

(73) Assignee: Nokia Corporation, Espoo (FI)

( * ) Notice: Subject to any disclaimer, the term of this patent is extended or adjusted under 35 U.S.C. 154(b) by 224 days.

(21) Appl. No.: 12/915,954

(22) Filed: Oct. 29, 2010

(65) Prior Publication Data

US 2012/0110267 A1 May 3, 2012

(51) Int. Cl.
| | | |
|---|---|---|
| G06F 12/00 | (2006.01) | |
| G06F 13/00 | (2006.01) | |
| G06F 13/28 | (2006.01) | |
| G06F 3/00 | (2006.01) | |
| H04M 3/42 | (2006.01) | |
| H04M 3/493 | (2006.01) | |

(52) U.S. Cl.
USPC ........... 711/156; 711/121; 711/126; 711/163; 715/708; 455/414.2

(58) Field of Classification Search
USPC ............. 711/121, 126, 154, 163, 156; 718/1; 715/708; 455/414.2
See application file for complete search history.

(56) References Cited

U.S. PATENT DOCUMENTS

| | | | |
|---|---|---|---|
| 8,301,594 B2 * | 10/2012 | Nihei | 707/621 |
| 2002/0174073 A1 * | 11/2002 | Nordman et al. | 705/64 |
| 2005/0003804 A1 * | 1/2005 | Huomo et al. | 455/414.1 |
| 2005/0132239 A1 | 6/2005 | Athas et al. | |
| 2006/0075192 A1 | 4/2006 | Golden et al. | |
| 2007/0198981 A1 | 8/2007 | Jacobs et al. | |
| 2008/0077865 A1 * | 3/2008 | Hiles et al. | 715/708 |
| 2009/0254901 A1 * | 10/2009 | King | 718/1 |
| 2012/0084525 A1 * | 4/2012 | Jegu et al. | 711/163 |

OTHER PUBLICATIONS

International Search Report and Written Opinion for International Application No. PCT/IB2011/054606, mailed Mar. 28, 2012.

* cited by examiner

*Primary Examiner* — Ryan Bertram
(74) *Attorney, Agent, or Firm* — Alston & Bird LLP

(57) ABSTRACT

A method for providing context classification may include causing selection of a single core in a multi-core processor as a context core in a user terminal, configuring cache memory associated with the context core to enable the context core to process context information for the user terminal, and causing execution of prediction and control functions related to user interface interactions based on the context information processed at the context core. Corresponding apparatuses are also provided.

17 Claims, 4 Drawing Sheets

METHOD AND APPARATUS FOR PROVIDING EFFICIENT CONTEXT CLASSIFICATION

TECHNOLOGICAL FIELD

An embodiment of the present invention relates generally to user interface technology and, more particularly, relates to a method and apparatus for providing efficient context classification to facilitate improvement of interaction flow with respect to user interface operations.

BACKGROUND

The modern communications era has brought about a tremendous expansion of wireline and wireless networks. Computer networks, television networks, and telephony networks are experiencing an unprecedented technological expansion, fueled by consumer demand. Networking technologies have addressed related consumer demands, while providing more flexibility and immediacy of information transfer.

Current and future networking technologies continue to facilitate ease of information transfer and convenience to users by expanding the capabilities of electronic devices and by improving network performance. One advance that has improved the capabilities of electronic devices to provide services and processing to users is the use of parallel computing. Parallel computing involves either the user of multiple processors or multi-core processors in a single device or multiple processors distributed over different devices to perform computing operations such as calculations, computations or other processing efforts using the parallel resources of the processors involved. Thus, for example, some threads may be processed on one processor or core, while other threads may be simultaneously processed on another processor or core.

Significant increases in speed and processing capabilities may be added to devices or systems that employ parallel computing. Indeed multi-processor and/or multi-core processing paradigms are becoming more common. However, multi-processor and/or multi-core processing may end up being relatively heavy and power hungry in some implementations. Particularly in devices where power and processing capabilities are not unlimited (e.g., mobile devices or other battery operated platforms), it may become important to balance the consumption of resources against achievable performance characteristics unless other factors that improve efficiency can be developed.

BRIEF SUMMARY

A method, apparatus and computer program product are therefore provided to enable relatively efficient context classification. In this regard, for example, some embodiments may provide an architecture capable of efficiently supporting context classification in a multi-core environment.

In one example embodiment, a method of supporting context classification in a multi-core environment is provided. The method may include causing selection of a single core in a multi-core processor as a context core in a user terminal, configuring cache memory associated with the context core to enable the context core to process context information for the user terminal, and causing execution of prediction and control functions related to user interface interactions based on the context information processed at the context core.

In another example embodiment, an apparatus for supporting context classification in a multi-core environment is provided. The apparatus may include at least one processor and at least one memory including computer program code. The at least one memory and the computer program code may be configured to, with the at least one processor, cause the apparatus to perform at least causing selection of a single core in a multi-core processor as a context core in a user terminal, configuring cache memory associated with the context core to enable the context core to process context information for the user terminal, and causing execution of prediction and control functions related to user interface interactions based on the context information processed at the context core.

In one example embodiment, another apparatus for supporting context classification in a multi-core environment is provided. The apparatus may include means for causing selection of a single core in a multi-core processor as a context core in a user terminal, means for configuring cache memory associated with the context core to enable the context core to process context information for the user terminal, and means for causing execution of prediction and control functions related to user interface interactions based on the context information processed at the context core.

In one example embodiment, a computer program product for supporting context classification in a multi-core environment is provided. The computer program product may include at least one computer-readable storage medium having computer-executable program code instructions stored therein. The computer-executable program code instructions may include program code instructions for causing selection of a single core in a multi-core processor as a context core in a user terminal, configuring cache memory associated with the context core to enable the context core to process context information for the user terminal, and causing execution of prediction and control functions related to user interface interactions based on the context information processed at the context core.

In another example embodiment, an apparatus for supporting context classification in a multi-core environment is provided. The apparatus may include a main memory and a multi-core processor having at least two cores configured to access the main memory via a memory bus. One core of the at least two cores may be selected as a context core. The context core may have cache memory associated therewith. The cache memory may be configured to enable the context core to process context information for the user terminal to perform prediction and control functions related to user interface interactions based on the context information processed at the context core.

An example embodiment of the invention may provide a method, apparatus and computer program product for employment in mobile environments or in fixed environments. As a result, for example, mobile terminal and other computing device users may enjoy an improved user interaction based on the provision of improved context recognition processes.

BRIEF DESCRIPTION OF THE DRAWING(S)

Having thus described some embodiments of the invention in general terms, reference will now be made to the accompanying drawings, which are not necessarily drawn to scale, and wherein:

DETAILED DESCRIPTION

Figure 1:
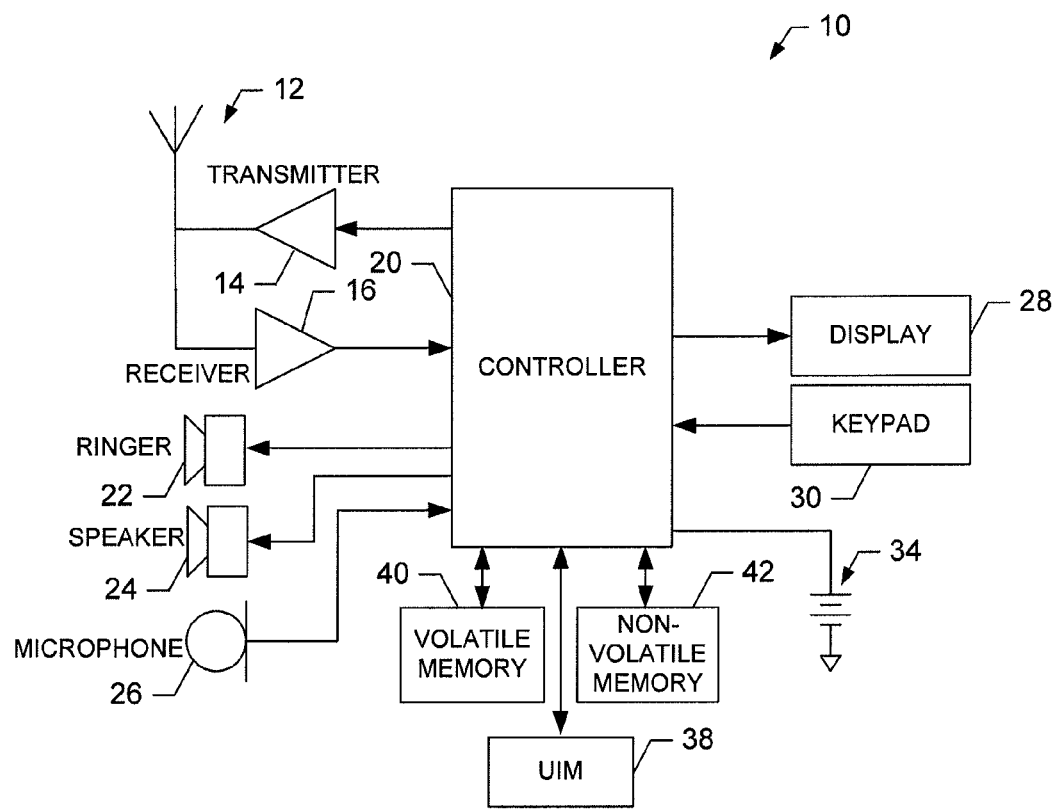
FIG. 1 is a schematic block diagram of a wireless communications system according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Enhancing or otherwise improving the user experience in relation to the interaction between the user and the user's electronic device is a constant goal of device designers and manufacturers. The ability to provide more seamless user interaction can be a highly determinative factor in creating marketing awareness to sell products and in creating customer loyalty and satisfaction. Providing a smooth flow of interaction with relatively little or at least a minimal amount of user input may be considered to provide the best user experience. In other words, users often prefer interaction that is automatic or appears as automatic as possible.

To provide users with a fluid and minimally invasive interaction experience, accurate and fast estimations of user intent or estimations of expected user actions may be important factors. Context information may be useful in enabling a device to make such estimations in a fast and reliable manner. Accordingly, many devices employ sensors and/or current device state or user activity monitors to determine context information that may be applicable and useable for improving user interaction. The processing of the data associated with these sensors and monitors may create a relatively large load. The use of a multi-core processor to handle the load may improve speed, but can sometimes cause bottlenecks associated with memory bus access and increase power consumption.

Some example embodiments may provide a mechanism by which to improve the relevance and timeliness of context information processing by employing an architecture that speeds up, for example, the creation of associative content to current user state. In some embodiments, a single core of a multi-core processor may be virtualized to be dedicated to context recognition tasks. By containing the data structures associated with the context engine that is virtualized by the architecture within the core registers and cache space (e.g., L1 and/or L2 cache) of the dedicated core, improved performance may be achieved (e.g., with less need to access the memory bus). Moreover, such an example embodiment may be unobtrusive in that it avoids a need for rewriting the rest of the software on the corresponding device. In some cases, the dedicated core may also be tuned to handle certain other operations (e.g., special bit operations) more efficiently and effectively. Thus, for example, some embodiments may enable processing via cache memory, which is faster than use of random access memory, to provide context prediction with minimal time delay for improved user interface responsiveness.

FIG. 1, one example embodiment of the invention, illustrates a block diagram of a mobile terminal 10 that may benefit from embodiments of the present invention. It should be understood, however, that a mobile terminal as illustrated and hereinafter described is merely illustrative of one type of device that may benefit from embodiments of the present invention and, therefore, should not be taken to limit the scope of embodiments of the present invention. While several embodiments of the mobile terminal 10 may be illustrated and hereinafter described for purposes of example, other types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, may readily employ embodiments of the present invention. Even fixed devices may employ some example embodiments.

The mobile terminal 10 may include an antenna 12 (or multiple antennas) in operable communication with a transmitter 14 and a receiver 16. The mobile terminal 10 may further include an apparatus, such as a controller 20 or other processing hardware, that controls the provision of signals to and the reception of signals from the transmitter 14 and receiver 16, respectively. The signals may include signaling information in accordance with the air interface standard of the applicable cellular system, and/or may also include data corresponding to user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

It is understood that the apparatus, such as the controller 20, may include circuitry implementing, among others, audio and logic functions of the mobile terminal 10. For example, the controller 20 may comprise a digital signal processor device, a microprocessor device, and various analog to digital converters, digital to analog converters, and/or other hardware support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 24, a ringer 22, a microphone 26, a display 28, and a user input interface, which may be coupled to the controller 20. The user input interface, which allows the mobile terminal 10 to receive data, may include any of a number of devices allowing the mobile terminal 10 to receive data, such as a keypad 30, a touch display (not shown), a microphone 26 or other input device. In embodiments including the keypad 30, the keypad 30 may include numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are used to operate the mobile terminal 10, as well as optionally providing mechanical vibration as a detectable output.

The mobile terminal 10 may further include a user identity module (UIM) 38, which may generically be referred to as a smart card. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), or any other smart card. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The non-volatile memory 42 may additionally or alternatively comprise an electrically erasable programmable read only memory (EEPROM), flash memory or the like. The memories may store any of a number of pieces of information, and data, used by the mobile terminal 10 to implement the functions of the mobile terminal 10.

Figure 2:
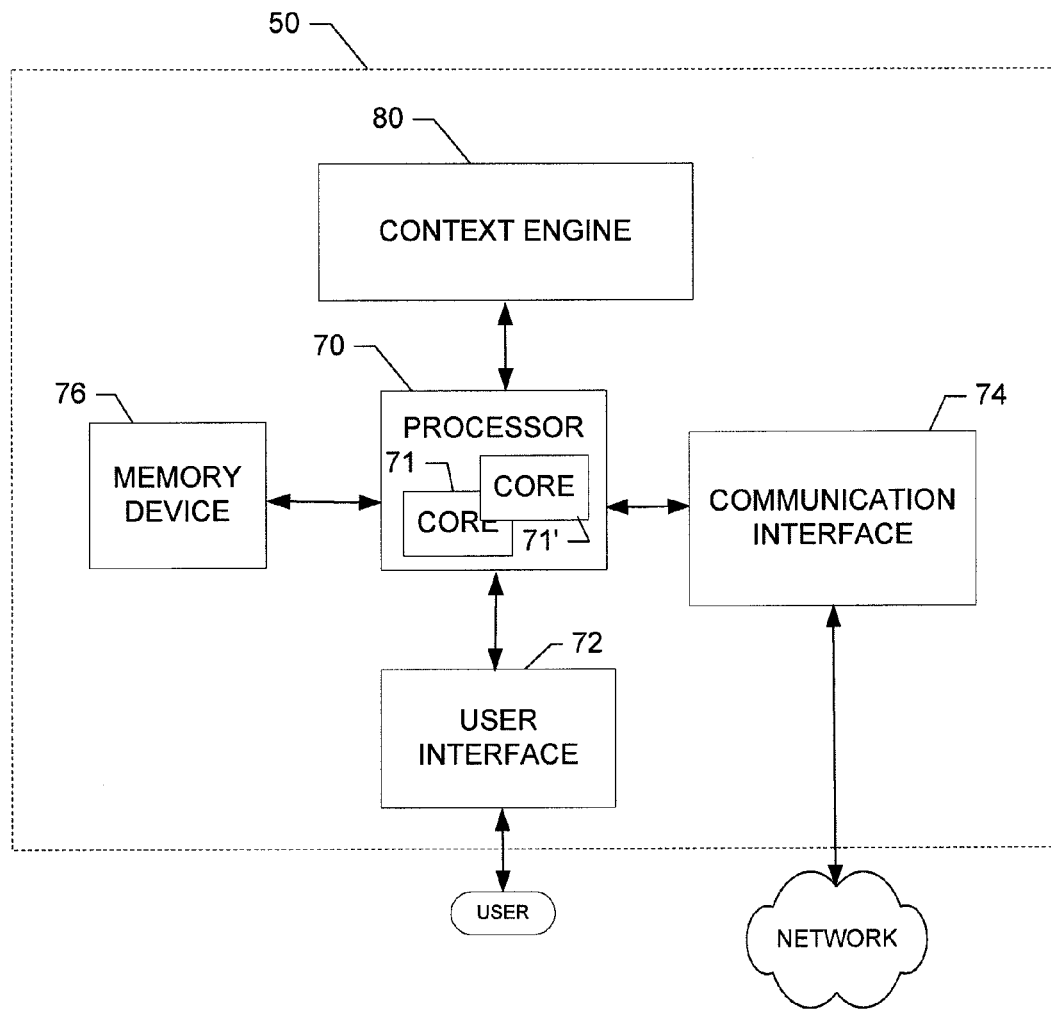
FIG. 2 illustrates a block diagram of an apparatus for supporting context classification in a multi-core environment according to an example embodiment of the present invention.

FIG. 2 illustrates a schematic block diagram of an apparatus for providing context classification according to an example embodiment of the present invention. An example embodiment of the invention will now be described with reference to FIG. 2, in which certain elements of an apparatus 50 for providing context classification are displayed. The apparatus 50 of FIG. 2 may be employed, for example, on the mobile terminal 10. However, the apparatus 50 may alternatively be embodied at a variety of other devices, both mobile and fixed. In some cases, an embodiment may be employed on either one or a combination of devices. Accordingly, some embodiments of the present invention may be embodied wholly at a single device (e.g., the mobile terminal 10), by a plurality of devices in a distributed fashion or by devices in a client/server relationship. Furthermore, it should be noted that the devices or elements described below may not be mandatory and thus some may be omitted in certain embodiments.

Referring now to FIG. 2, an apparatus for providing context classification is provided. The apparatus 50 may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a vector processor, a graphics processing unit (GPU), a special-purpose computer chip, or other similar hardware processors. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal, a fixed terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, or a combination of hardware and software, that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a communication device (e.g., the mobile terminal 10), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

Although an example embodiment will now be described in the context of a multi-core processor, it should be appreciated that some embodiments may also be practiced in environments where multiple processors are networked together, as described above. In an example embodiment, the processor 70 may be a multi-core processor with two, four, six, eight, or any desirable number of cores. Each of the multiple processor cores (represented by cores 71 and 71') may represent a portion of the processor 70 that actually reads and executes instructions. Moreover, in an example embodiment, the cores 71 and 71' (along with other cores if more than two cores are implemented) may execute code or threads in parallel. In this regard, in some cases, parallel libraries may be employed to provide standard implementations and patterns for enabling code to be written in a portable way that can be scaled depending on the number of processors available in a particular environment as described in greater detail below.

In an exemplary embodiment, the processor 70 may be embodied as, include or otherwise control a context engine 80. As such, in some embodiments, the processor 70 may be said to cause, direct or control the execution or occurrence of the various functions attributed to the context engine 80 as described herein. The context engine 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the context engine 80 as described herein. Thus, in examples in which software is employed, a device or circuitry (e.g., the processor 70 in one example) executing the software forms the structure associated with such means.

In an example embodiment, the context engine 80 may generally be configured to perform any or all of series of operations that may in some cases include causing selection of a single core in a multi-core processor as a context core in a user terminal, configuring cache memory associated with the context core to enable the context core to process context information for the user terminal, and causing execution of prediction and control functions related to user interface interactions based on the context information processed at the context core. In some embodiments, the context engine 80 may be virtualized on a single one of the cores 71 or 71'. Accordingly, all processing associated with context recognition tasks may be performed on a single core to enable focused attention of the single core to the load associated with context determinations and predictions associated with improving user experience. In an example embodiment, not only may the context engine 80 be virtualized on a single core of the multi-core processor (e.g., processor 70), but the data structures associated with the context engine 80 may be provided entirely on the core registers and cache memory (e.g., L1 and/or L2 cache of a multi-level cache memory) of the single core as well. Thus, the need for accessing main memory (e.g., the memory device 76) may be significantly reduced and improved performance may be experienced.

Figure 3:
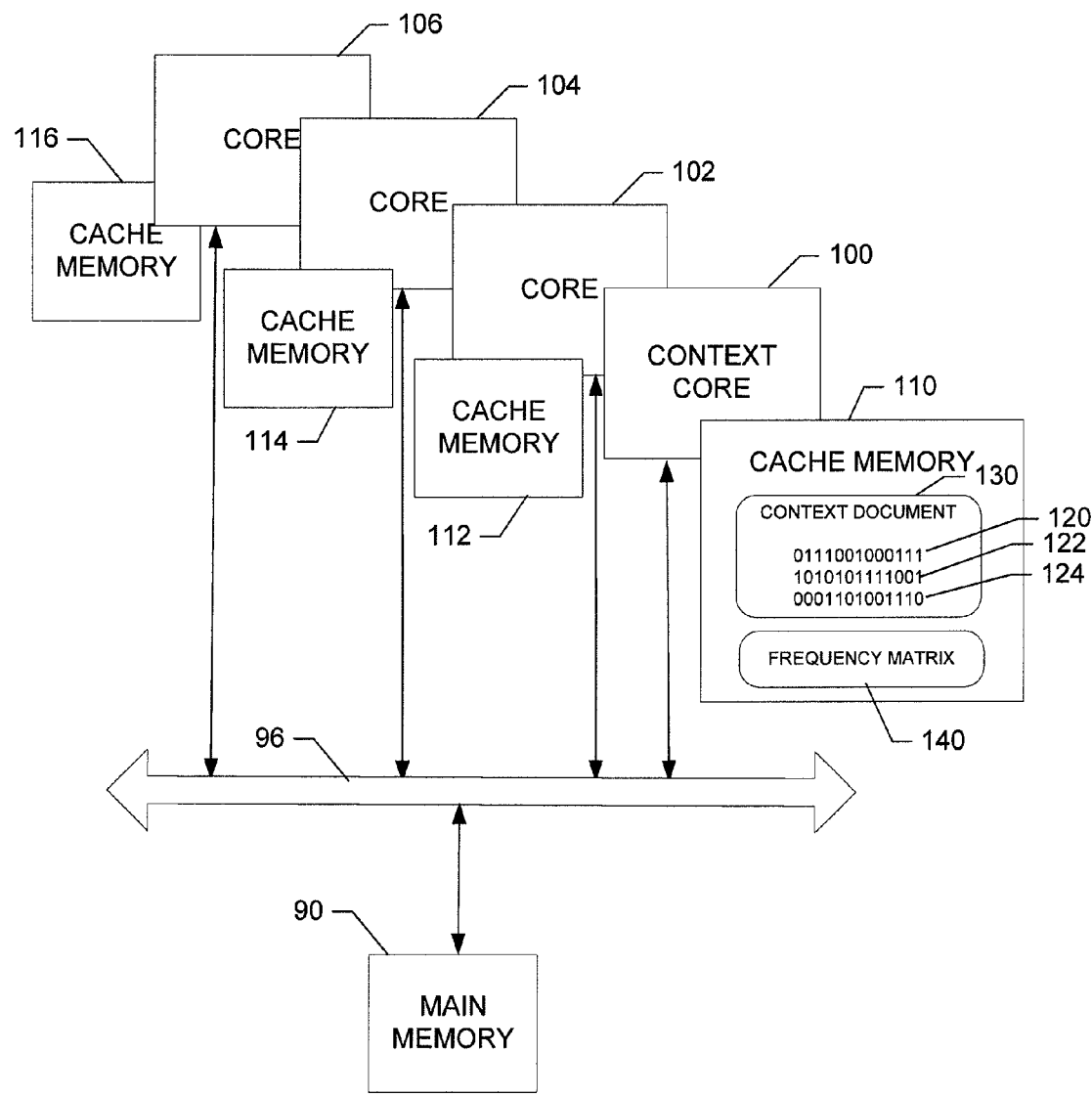
FIG. 3 illustrates a more detailed block diagram of an architecture for supporting context classification in a multi-core environment according to an example embodiment.

FIG. 3 illustrates a block diagram of a multi-core processor configured to perform an example embodiment. As shown in FIG. 3, the multi-core processor may include a plurality of cores (four in this example), but any suitable number including two or more cores may be utilized in various different example embodiments. The cores may be in communication with each other via an internal bus or other communication mechanism. The cores may also have the ability to access main memory 90 (e.g., the memory device 76 of FIG. 2) via a memory access bus 96. Generally speaking, the cores (e.g., cores 100, 102, 104 and 106) may or may not share cache memory (e.g., L1 and/or L2 caches). However, in an example embodiment, each of the cores 100, 102, 104 and 106 may include a corresponding cache memory (e.g., cache memories 110, 112, 114 and 116, respectively) that is not shared. In some alternatives, one level (e.g., L1 cache) of cache memory may be exclusive to each respective core and another level (e.g., L2 cache) may be shared by some or all cores. Regardless of the sharing paradigm, data structures associated with the context engine 80 may be stored in the cache memory. The context engine 80 may also be configured to include instructions defining control and prediction algorithms for determining context information and for making predictions of context or based on the context information, respectively.

Accordingly, in an example embodiment, the context engine 80 may be embodied by virtualization using a single one of the cores such as core 100 (hereinafter context core 100). The cache memory 110 of the context core 100 may store data structures defining the context engine 80 and may also buffer or store data associated with context information (e.g., sensor and/or monitor data) that can be used for enabling the context engine 80 to determine the context of the apparatus 50 and/or make predictions by defining a prediction algorithm and/or control algorithms for handling user interface related interactions. For example, the context engine 80 may be configured to predict (e.g., via the prediction algorithm) a preferred view for display based on a user input (e.g., the first web site to go to after a browser is opened), predict context based on a user input (e.g., determining a home environment if the user selects a WLAN access point), and/or predicting a user input from context (e.g., making an alarm clock large when it is determined that a device is in the home environment at evening time or some other time at which the alarm clock would be likely to be set).

In some embodiments, the context information processed by the context core 100 may include context strings (e.g., context strings 120, 122, 124, etc.). Each context string may be a unique bit sequence descriptive of user actions, sensor data, current state (e.g., application environment) and/or the like. Multiple context strings may be stored in the cache memory 110 of the context core 100 to form a context document 130. The context document 130 may be applicable to a corresponding time window. In some embodiments, the time windows may each be given a set of random indices (e.g., according to an index scheme providing positive and negative random indexes). The data associated with the context strings may be added to a frequency matrix 140 residing in the cache memory 110 (e.g., in an L1 and/or L2 cache). The frequency matrix 140 may indicate the frequency at which certain user actions, sensor data, state information and other occurrences associated with context strings are encountered. Data stored in the cache memory 110 may be used to retrieve an estimate of the current context. For example, a comparison may be made between context strings to determine a degree of matching between a context string associated with the current time window and previous context strings. In some embodiments, a Hamming distance between the context strings or other measurement of difference that can be performed relatively quickly and yet provide a relatively accurate indication of the degree of similarity between strings may be employed. Moreover, in some embodiments, a prediction vector may be generated by the context engine 80 relatively quickly for real time user interface adaptation based on the context information.

Some embodiments may provide for relatively small changes to mobile device production streams by providing algorithms for determining context information (e.g., via the context engine 80) that fit on one core and cache and can therefore be unobtrusively inserted into a system. Moreover, since the cache memory 110 includes the context engine 80, prediction algorithm related functions of the context engine 80 may be performed without requiring memory bus access (e.g., to the main memory), which is often a bottleneck for system level processes that encounter delays. The prediction and control algorithms of the context engine 80 may stay active and in cache for a whole power up-down cycle.

Additionally, the frequency matrix 140 may be fully stored in the cache memory 110 (e.g., in an L2 cache) to make the frequency matrix 140 available at all times without cache misses or memory paging events. In some embodiments, the size of the frequency matrix 140 may be fixed in advance and thus it may be possible to scale machine learning data to a predefined side of the L2 cache. In some cases, new training data can be added without changing the size of the frequency matrix 140 (e.g., making the L2 cache implementation adaptive for use with respect to data gathering and machine learning while on normal consumer use to improve the relevance of predictions. Furthermore, it may be possible to implement a system in a way that provides a new prediction result ready to be used by another system synchronously at given time intervals. Complexity may therefore be reduced for the user interface design.

In some embodiments, since relevant prediction may require or otherwise be improved by increased computing cycles and therefore increased learning opportunities, specific points of emphasis may be set up to facilitate handling certain operations. For example, the context core 100 may be tuned to handle certain predefined or special bit operations. As such, the context core 100 may be configured to be a special context accelerator enabled to identify special context situations in a rapid and relatively accurate manner.

Figure 4:
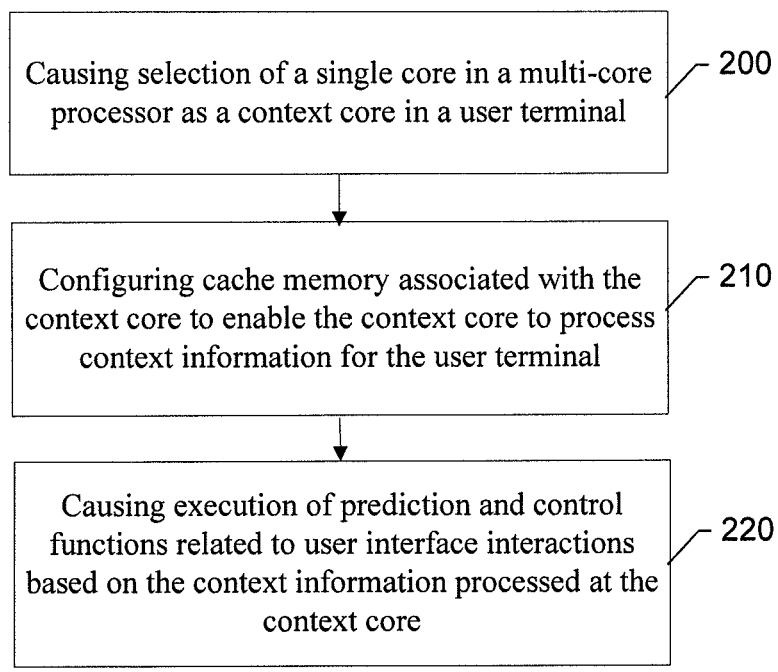
FIG. 4 is a flowchart according to a method for supporting context classification in a multi-core environment according to an example embodiment of the present invention.

FIG. 4 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions.

For example, one or more of the procedures described above may be embodied by computer program instructions. In this regard, the computer program instructions which embody the procedures described above may be stored by a memory device of a user terminal or other device and executed by a processor in the user terminal or other device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 4, may include causing selection of a single core in a multi-core processor as a context core in a user terminal at operation 200, configuring cache memory associated with the context core to enable the context core to process context information for the user terminal at operation 210, and causing execution of prediction and control functions related to user interface interactions based on the context information processed at the context core at operation 220.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein. In some embodiments, configuring cache memory may include configuring the cache memory to define a context document including a plurality of context strings that are each descriptive of a corresponding unique bit sequence descriptive of user actions, sensor data, or current state associated with the user terminal. In an example case, configuring cache memory to define the context document may include defining a plurality of context documents in which each of the context documents corresponds to a different time window. In some embodiments, causing execution of prediction and control functions may include causing execution of a prediction algorithm or a control algorithm based on received context related information without access by the context core to memory external to a memory cache of the multi-core processor. In an example embodiment, causing execution of prediction and control functions may include causing a comparison of a context string associated with a current time window to a previously stored context string. Predictions regarding user interface related interactions may then be made based on the comparison. In some embodiments, configuring cache memory may include configuring the cache memory to define a frequency matrix. In an example embodiment, causing selection of the single-core further may include virtualizing the context core to exclusively process context information for the user terminal.

In an example embodiment, an apparatus for performing the method of FIG. 4 above may comprise a processor (e.g., the processor 70 or the context core 100) configured to perform some or each of the operations (200-220) described above. The processor may, for example, be configured to perform the operations (200-220) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-220 may comprise, for example, the context engine 80. Additionally or alternatively, at least by virtue of the fact that the processor 70 or context core 100 may be configured to control or even be embodied as the context engine 80, the processor 70, context core 100 and/or a device or circuitry for executing instructions or executing an algorithm for processing information as described above may also form example means for performing operations 200-220.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   causing selection of a single core in a multi-core processor as a context core in a user terminal;
   configuring cache memory associated with the context core to enable the context core to process context information for the user terminal;
   causing execution of prediction and control functions related to user interface interactions based on the context information processed at the context core; and
   wherein configuring cache memory comprises configuring the cache memory to define a context document including a plurality of context strings that are each descriptive of a corresponding unique bit sequence descriptive of user actions, sensor data, or current state associated with the user terminal.

2. The method of claim 1, wherein configuring cache memory to define the context document comprises defining a plurality of context documents in which each of the context documents corresponds to a different time window.

3. The method of claim 1, wherein causing execution of prediction and control functions comprises causing execution of a prediction algorithm or a control algorithm based on received context related information without access by the context core to memory external to a memory cache of the multi-core processor.

4. The method of claim 1, wherein causing execution of prediction and control functions comprises causing a comparison of a context string associated with a current time window to a previously stored context string.

5. The method of claim 1, wherein configuring cache memory comprises configuring the cache memory to define a frequency matrix.

6. The method of claim 1, wherein causing selection of the single-core further comprises virtualizing the context core to exclusively process context information for the user terminal.

7. An apparatus comprising at least one processor and at least one memory including computer program code, the at least one memory and the computer program code configured to, with the at least one processor, cause the apparatus at least to:
cause selection of a single core in a multi-core processor as a context core in a user terminal;
configure cache memory associated with the context core to enable the context core to process context information for the user terminal;
cause execution of prediction and control functions related to user interface interactions based on the context information processed at the context core; and
wherein the at least one memory and computer program code are configured to, with the at least one processor, cause the apparatus to configure cache memory by configuring the cache memory to define a context document including a plurality of context strings that are each descriptive of a corresponding unique bit sequence descriptive of user actions, sensor data, or current state associated with the user terminal.

8. The apparatus of claim 7, wherein the at least one memory and computer program code are configured to, with the at least one processor, cause the apparatus to configure the cache memory to define the context document by defining a plurality of context documents in which each of the context documents corresponds to a different time window.

9. The apparatus of claim 7, wherein the at least one memory and computer program code are configured to, with the at least one processor, cause the apparatus to cause execution of prediction and control functions by causing execution of a prediction algorithm or a control algorithm based on received context related information without access by the context core to memory external to a memory cache of the multi-core processor.

10. The apparatus of claim 7, wherein the at least one memory and computer program code are configured to, with the at least one processor, cause the apparatus to cause execution of prediction and control functions by causing a comparison of a context string associated with a current time window to a previously stored context string.

11. The apparatus of claim 7, wherein the at least one memory and computer program code are configured to, with the at least one processor, cause the apparatus to configure the cache memory by configuring the cache memory to define a frequency matrix.

12. The apparatus of claim 7, wherein the at least one memory and computer program code are configured to, with the at least one processor, cause the apparatus to select the single-core by further virtualizing the context core to exclusively process context information for the user terminal.

13. An apparatus comprising:
a main memory; and
a multi-core processor having at least two cores configured to access the main memory via a memory bus;
wherein one core of the at least two cores is selected as a context core, the context core having cache memory associated therewith, the cache memory configured to enable the context core to process context information for the user terminal to perform prediction and control functions related to user interface interactions based on the context information processed at the context core; and
wherein the cache memory is configured to store a context document including a plurality of context strings that are each descriptive of a corresponding unique bit sequence descriptive of user actions, sensor data, or current state associated with the apparatus.

14. The apparatus of claim 13, wherein the cache memory is configured to define a plurality of context documents in which each of the context documents corresponds to a different time window.

15. The apparatus of claim 13, wherein the context core is configured to cause execution of a prediction algorithm or a control algorithm based on received context related information without access by the context core to the main memory via the memory bus.

16. The apparatus of claim 13, wherein the context core is configured to predict context information based on a comparison of a context string associated with a current time window to a previously stored context string.

17. The apparatus of claim 13, wherein the context core is configured to define a frequency matrix in the cache memory.

* * * * *